United States Patent [19]
Cameron

[11] Patent Number: 5,570,542
[45] Date of Patent: Nov. 5, 1996

[54] SAFETY SHIELD WINDOW INSERT

[76] Inventor: Allan Cameron, 272 Entrada Dr., Santa Monica, Calif. 90402

[21] Appl. No.: 265,221

[22] Filed: Jun. 20, 1994

[51] Int. Cl.$^6$ ...................................................... E06B 3/32
[52] U.S. Cl. .................................. 49/463; 49/55; 49/57; 49/61; 160/105
[58] Field of Search ................................. 49/463, 50, 55, 49/61, 502, 48, 57; 160/105, DIG. 2, DIG. 7

[56] References Cited

U.S. PATENT DOCUMENTS

| | | | |
|---|---|---|---|
| 610,437 | 9/1898 | Dillenbeck | 160/105 |
| 2,294,966 | 9/1942 | Dreyfus | 160/DIG. 7 |
| 2,568,800 | 9/1951 | Galla | 160/105 |
| 2,915,119 | 12/1959 | Cox | 160/105 X |
| 3,166,116 | 1/1965 | Cole, Jr. | 160/105 X |
| 3,236,171 | 2/1966 | Vaskov et al. | 49/463 X |
| 3,847,201 | 11/1974 | Kalish | 160/105 |
| 3,855,898 | 12/1974 | McDonald | 49/502 X |
| 4,331,359 | 5/1982 | Sheldon | 49/63 X |
| 4,562,666 | 1/1986 | Young, III | 49/463 X |
| 4,653,562 | 3/1987 | Moss et al. | 160/DIG. 2 |
| 4,799,422 | 1/1989 | Birt | 160/105 X |
| 4,913,212 | 4/1990 | Clavier | 160/105 |

*Primary Examiner*—Philip C. Kannan
*Attorney, Agent, or Firm*—Graham & James LLP

[57] ABSTRACT

A safety device for an automobile such as a car or a van, the safety device being a window insert designed to fit within the standard frame of a window and be retained within the frame by the upper edge of the window fitting within a groove configured on the lower edge of the window insert. The window insert may include orifices to allow air inflow and/or outflow so as to provide a continuous flow of fresh air into the vehicle. The safety device may be used to retain a child or a pet, and can be formed from a plastic, plexiglass or polycarbonate material. Alternatively, the window insert may be formed from a high impact or bullet-proof material.

16 Claims, 8 Drawing Sheets

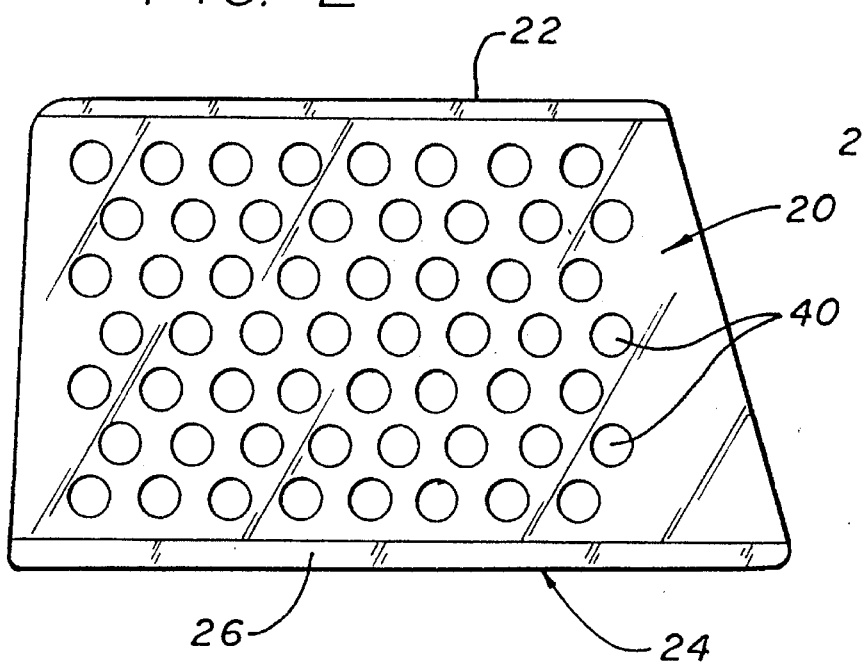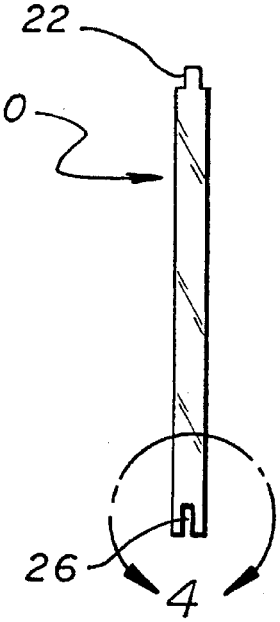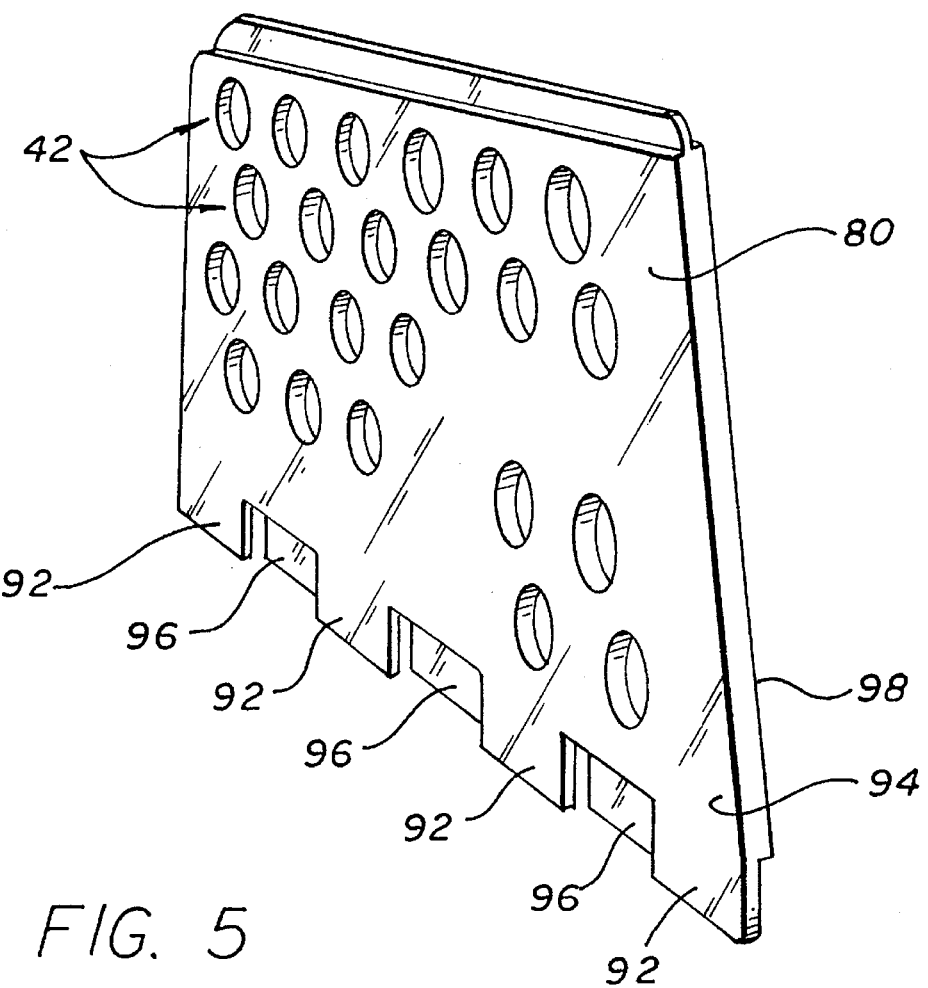

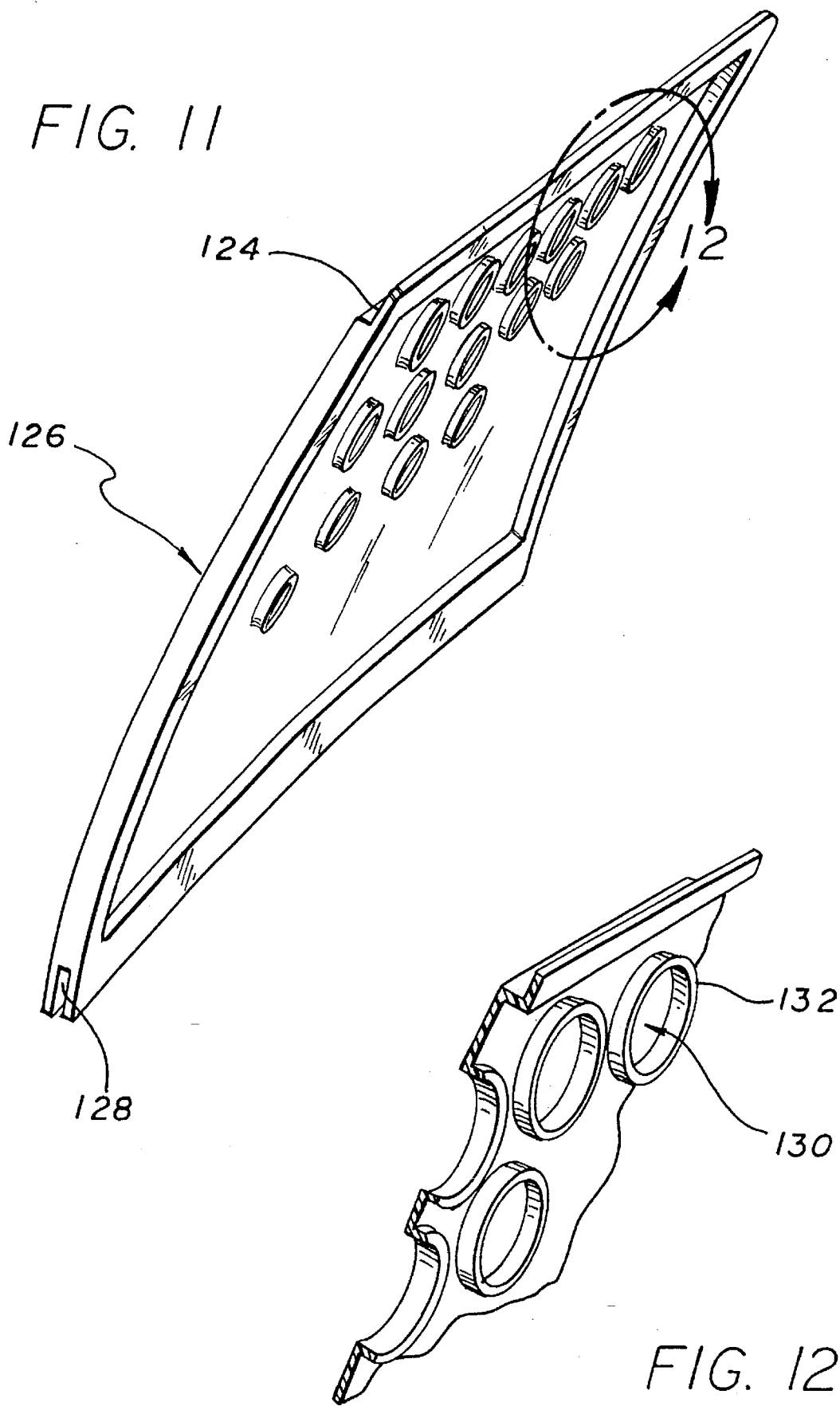

5,570,542

SAFETY SHIELD WINDOW INSERT

BACKGROUND OF THE INVENTION

The present invention is directed to the field of automotive safety equipment. More particularly, the present invention is directed to a defeasible shield window insert which may be inserted and retained within an opening for an automotive window.

Automobile manufacturers are increasingly incorporating safety features into the design of automobiles. However, with respect to the windows on the automobile, the industry standard remains to simply use a glass window which retracts into the door frame. One safety feature that has been incorporated has been the use of a locking device activated by the driver which can be used to prevent passenger windows from being opened. This device is primarily intended for limiting the ability of small children to open a passenger door window.

With respect to a first aspect of the present invention, there are few, if any, devices available to restrain a child or family pet, such as a dog or a cat, from exiting through an open window, other than a cage or container. However, for the comfort of the child or pet, it is beneficial to allow a constant flow of fresh air into the vehicle. Thus, currently, the only choice for parents or pet owners who wish to allow their children or pets to be less confined physically within the car while allowing fresh air flow is to limit how far down the window is retracted, so as to prevent the child or pet from exiting through the window.

With respect to a second aspect of the invention, there has been increasing concern about and awareness of, the vulnerability of a vehicular occupant to bodily injury or attack as a result of the relative ease of access to the occupant of a vehicle via the glass window of the door. Glass windows may be easily broken, and provide little if any resistance to assault with a gun.

Currently, the only alternative for increasing the safety of a vehicle occupant with respect to the glass window is to have a custom modification of the vehicle done to install so called "bullet-proof" windows. Such custom modifications are both expensive and relatively uncommon, requiring extensive modifications to the door assembly. Accordingly, the installation of bullet proof windows in vehicles is not commonplace.

Accordingly, it would be beneficial to have an alternative to the standard car window.

SUMMARY OF THE INVENTION

The invention is directed to an insert formed from a clear or translucent material, adapted to be inset into, and retained by, the window opening within conventional automobiles. In a first aspect of the invention, the window insert is intended for use by parents and pet owners, and includes a plurality of openings allowing venting of air and free airflow for the benefit of the child or pet, yet having the openings proportioned to prevent the child or pet from exiting the vehicle via the window. The material forming the window insert is preferably an acrylic such as a polycarbonate material sold under the tradename LEXAN, a plastic or plexiglass material.

In the second aspect of the invention, the window insert is formed from a high impact resistant transparent material. The window insert is defeasibly installed into the window frame and retained by the window itself. The high impact material forming the window insert is preferably a "bullet proof" material, such as for example a glass composite or glass-plastic composite.

For either of the two alternative aspects of the invention, the window insert includes an upper ridge which fits within a groove in the upper frame of the door which normally receives the existing window. The window insert also includes some mechanism for allowing the existing window to be partially inserted and retained within a groove formed in the lower edge of the window insert, so that the window acts to retain the insert in place. It is contemplated that the window insert can be both custom formed for particular automobiles, or have a relatively limited number of standard sized panels which allow the edges to be trimmed so as to be semi-customized to particular window insert designs.

BRIEF DESCRIPTION OF THE DRAWINGS

FIG. 2 is a plan view of the window insert of FIG. 1;

FIG. 3 is a side view of the window insert of FIGS. 1 and 2;

FIG. 5 is a perspective view of another alternative embodiment of the window insert;

FIG. 11 is a perspective view of another alternative embodiment of the window insert;

FIG. 12 is an enlarged perspective view of the alternative embodiment of FIG. 11 identified by circle 12—12;

DETAILED DESCRIPTION OF THE PREFERRED EMBODIMENTS

Figure 1:
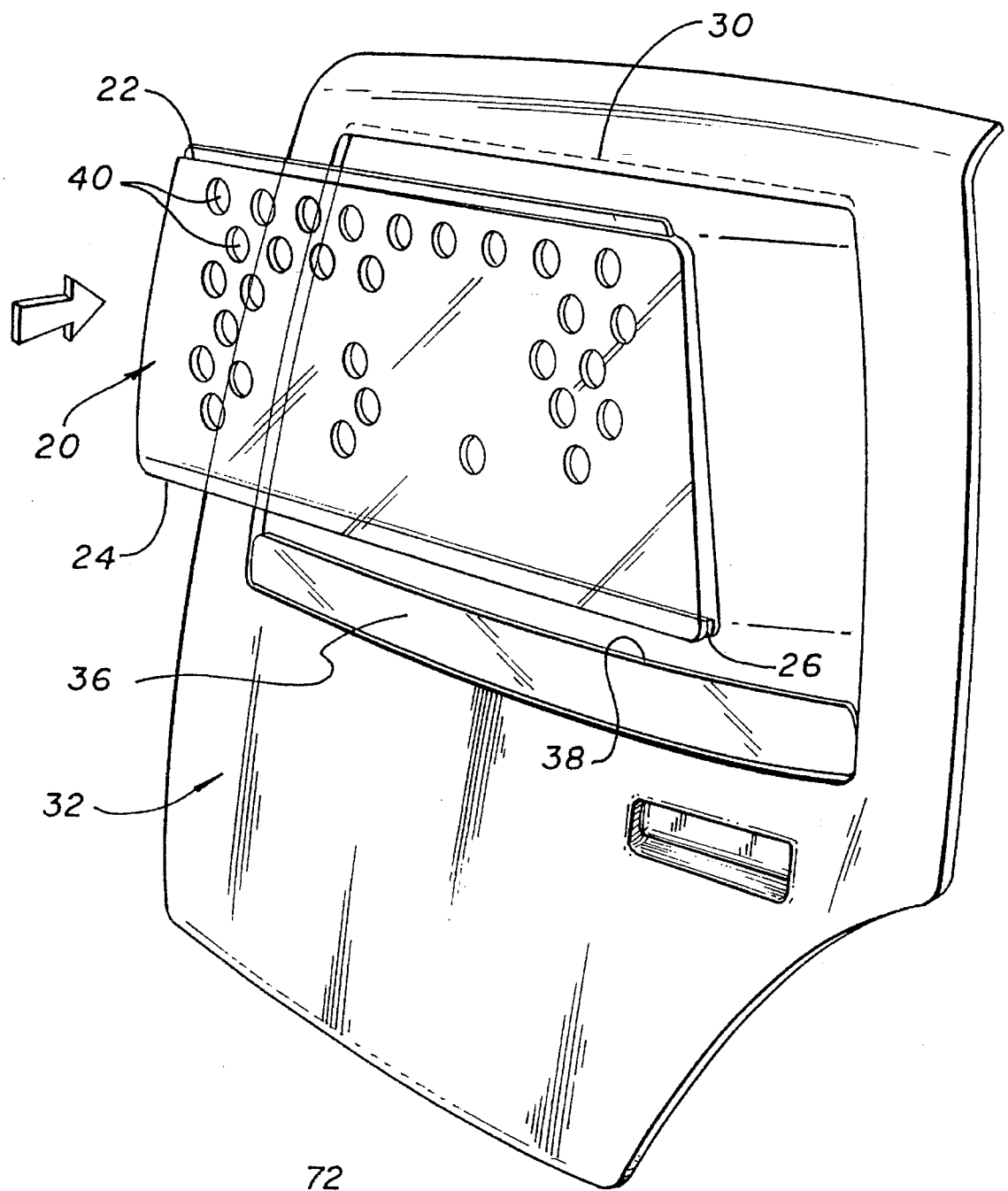
FIG. 1 is a perspective view of the window insert according to the first aspect of the present invention.

FIG. 1 depicts a window insert 20 according to a first aspect of the invention. The window insert 20 includes an upper edge 22 sized to be insertable into a receiving groove 30 defined by the window frame of a door 32 of an automobile, which receives the standard window 36 within the automobile. The window insert 20 also includes a lower edge 24 defining a grove 26 for receiving the top edge 38 of the standard window 36 of the automobile (not shown).

Accordingly, it may be appreciated that to install the window insert 20 of the present invention, the window 36 is retracted, the window insert 20 is inserted so that the upper edge 22 fits within the receiving groove 30 of the door 32 and then the window 36 is advanced upward to securely fit within the groove 26 of the window insert 20 thereby trapping the window insert 20 between the top edge of the window 36 and the frame of the door 32.

In the first aspect of the present invention, wherein the window insert is used primarily to retain children or pets, it is preferred to include at least one and potentially a plurality of holes or orifices 40 within the window insert 20 so that airflow can be facilitated. In the most basic embodiment of the invention, the orifices 40 may be simply circular openings cut perpendicular to the plane faces of the window insert, as shown in FIG. 1. The plurality of orifices 40 have a combined total open surface area of less than fifty percent of the total surface area of the window insert, as illustrated in the figures.

FIG. 3 is an edge view of the window insert 20 of FIGS. 1 and 2. As illustrated, the upper edge 22 has a reduced width portion to fit into the receiving groove 30 of the window frame in the door 32 of FIG. 1. Moreover, this top edge may be contoured over the width of the window insert 20, so that a flat sheet of material may accommodate a contoured door frame. The groove 26 on the lower edge 24 of the window insert 20 is also illustrated, and may similarly be contoured to receive a curved top edge 38 of the window 36.

Figure 4:
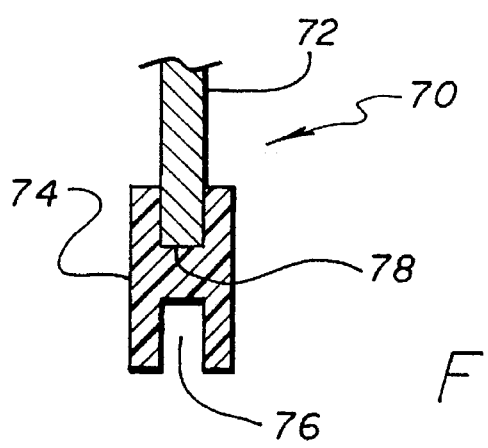
FIG. 4 is an edge view of an alternative design for the window insert of the present invention corresponding to the circle 4—4 of FIG. 3.
Figure 6:
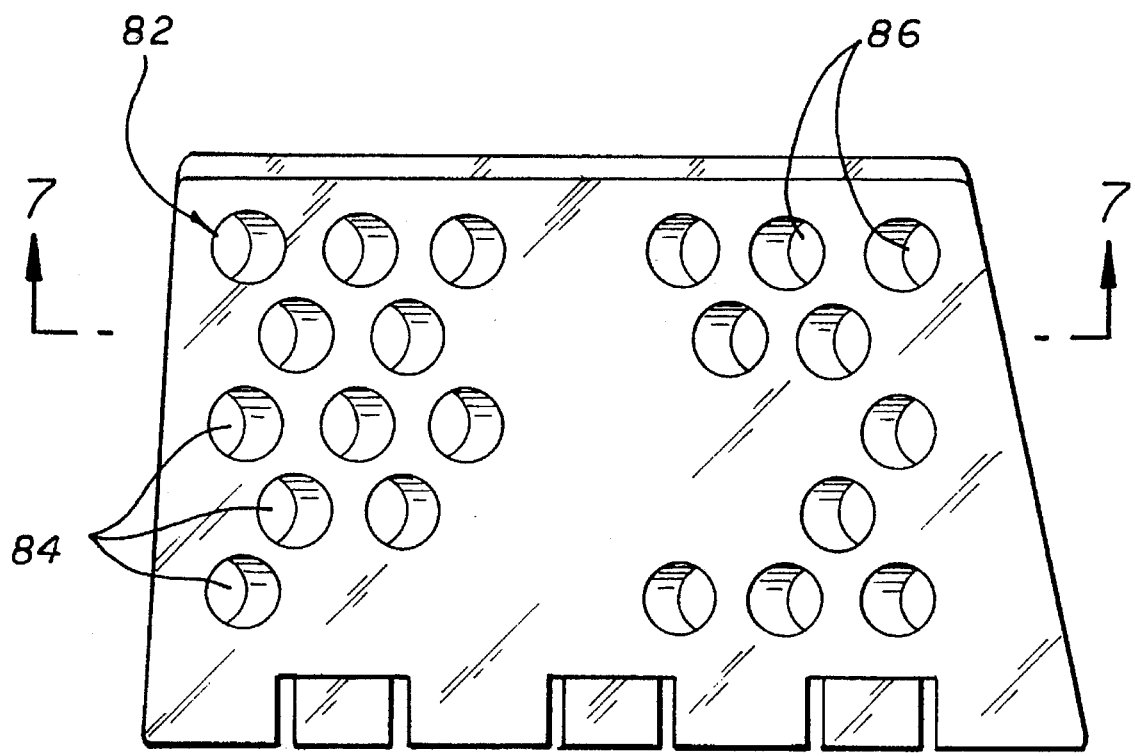
FIG. 6 is a plan view of the window insert of FIG. 5.
Figure 7:
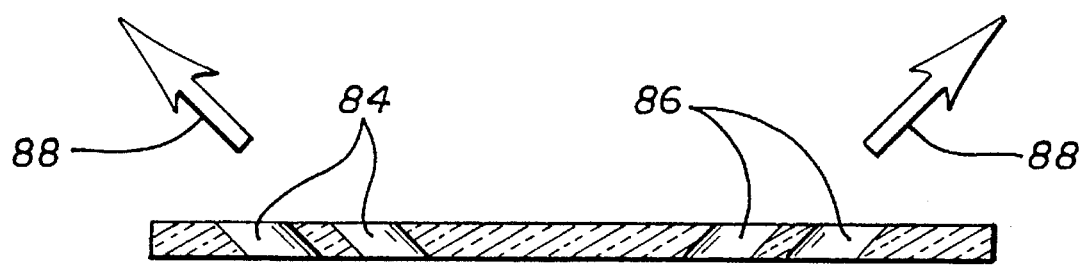
FIG. 7 is a cross sectional view along line 7—7 of the window insert of FIGS. 5 and 6.
Figure 8:
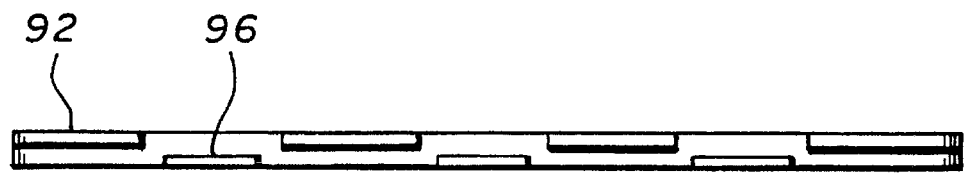
FIG. 8 is a bottom view of the window insert of FIGS. 5–7.

FIG. 4 is an edge view of the bottom portion of an alternative design for a window insert 70 of the present invention. In the alternative design depicted in FIG. 4, the window insert 70 may be formed from two components. The first component is a sheet 72 of material having a thickness approximately equal to the thickness of a normal window. The second component is a guide element 74 which may be secured to the sheet 72 on the lower edge thereof. The guide element 74 includes a groove 76 for receiving the top edge of the window much like the groove 26 on the window insert 20 according to FIG. 1. Accordingly, the guide element 74 is generally an H-shaped element having in addition to the groove 76, a top groove 78 for receiving the bottom edge of the sheet 72, thereby forming the window insert 70.

FIGS. 5–8 depict another alternative window insert 80, wherein orifices 82 are angled with respect to the plane faces of the window insert 80. Angling the orifices 82 allows for the alternative design to promote air inflow or air outflow, as shown by arrows 88, through the orifices 82. Moreover, the orifices 82 may include a first grouping of orifices 84 having a first angle and a second grouping of orifices 86 aligned to a second angle so that the first grouping of orifices 84 promote air inflow and the second grouping of orifices 86 promote air outflow. Thus, circulation from the leading to the trailing edge of the window insert can be promoted.

Further, in the embodiment of FIGS. 5–8, the lower edge 90 of the window insert 80 includes a first set of tabs 92 at an outer side 94, and a second set of tabs 96 at an inner side 98. The two sets of tabs 92 and 96 are designed to cooperatively retain the top edge 38 of the window 36 (FIG. 1). In addition, the tabs 92 and 96 may be readily trimmed to vary the overall height of the window insert 80.

Figure 9:
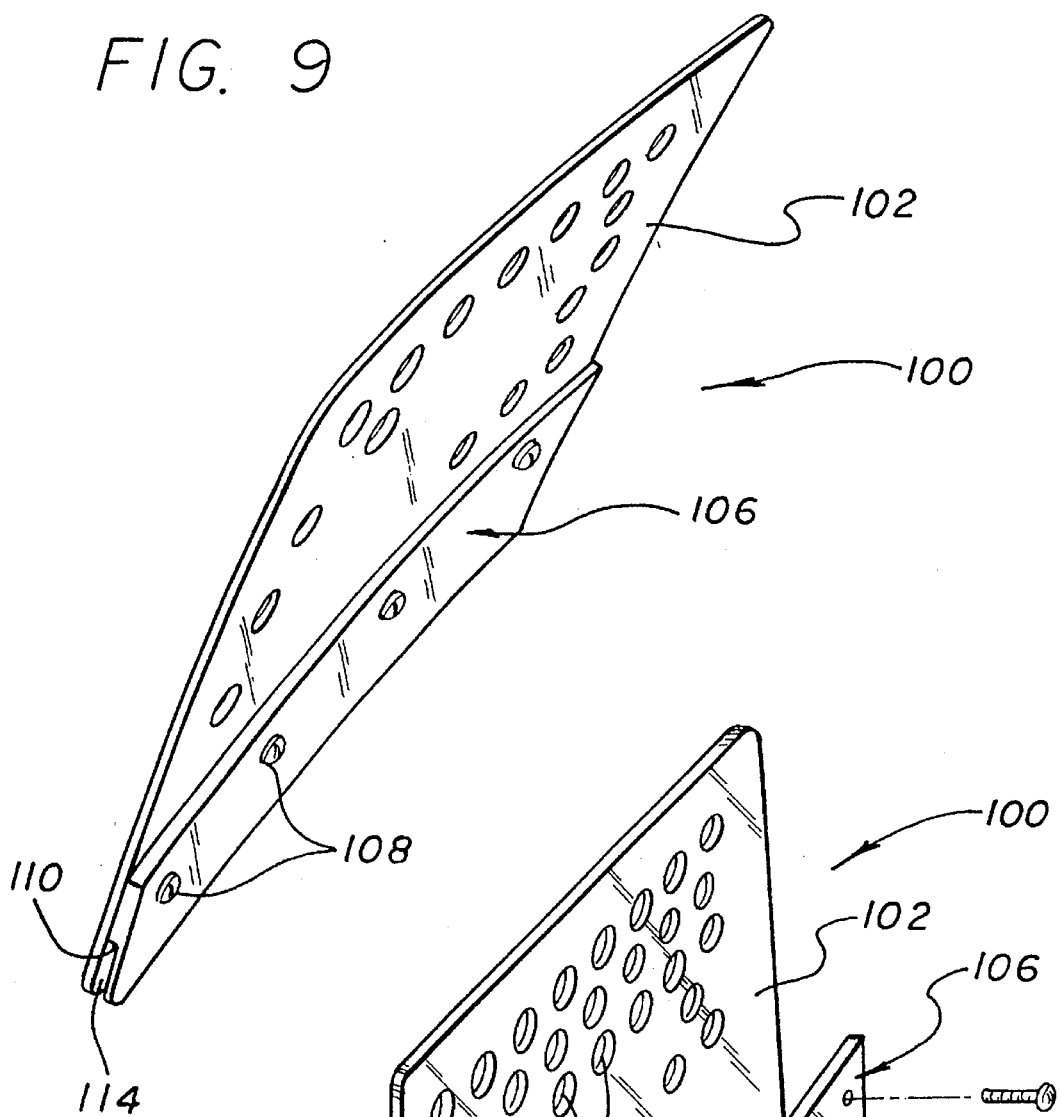
FIG. 9 is a perspective view of another alternative embodiment of the window insert.
Figure 10:
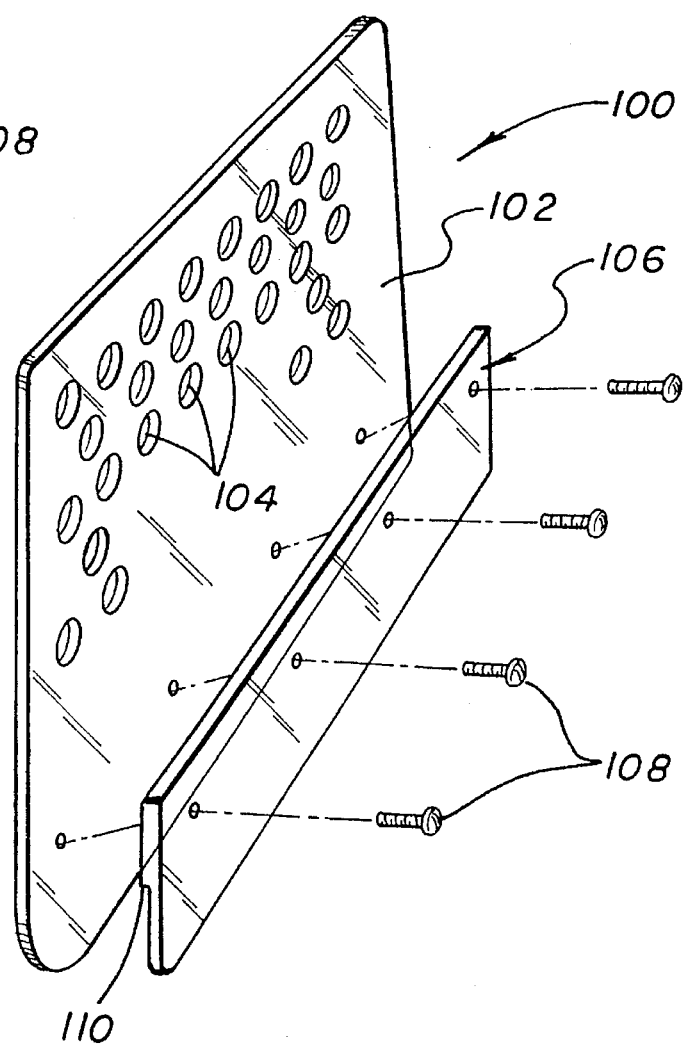
FIG. 10 is an exploded perspective view of the alternative embodiment of FIG. 9.

FIGS. 9 and 10 depict another alternative embodiment for a window insert 100 according to the present invention. As shown in FIG. 9 and the exploded view of FIG. 10, the window insert 100 includes a first sheet 102 which may include orifices 104, and a second retaining sheet 106, which may be secured to the first sheet 102 by rivets or screws 108.

The second retaining sheet 106 includes a step 110 on the side adjacent the first sheet 102. The step 110 is preferably equal in height to the thickness of a standard window, so that the window is retained between the first sheet 102 and the retaining sheet 106 in the groove 114 shown in FIG. 9, once the respective elements are secured together.

FIG. 11 is a perspective view of another alternative embodiment for a window insert 120, and FIG. 12 shows an enlarged perspective view identified by circle 12—12 in FIG. 11. In the design according to FIGS. 11 and 12, the window insert 120 is formed to define a stepped ridge 124 at its periphery 126, preferably along the top edge. As in the above embodiments, the window insert 120 includes a groove 128 at the lower edge to retain the window. In addition, the window insert 120 may include orifices 130 having a circumferential ridge 132, which defines and further strengthens the window insert 120. The design of FIGS. 11 and 12 is particularly well suited to manufacture using a vacuum molding technique.

Figure 13:
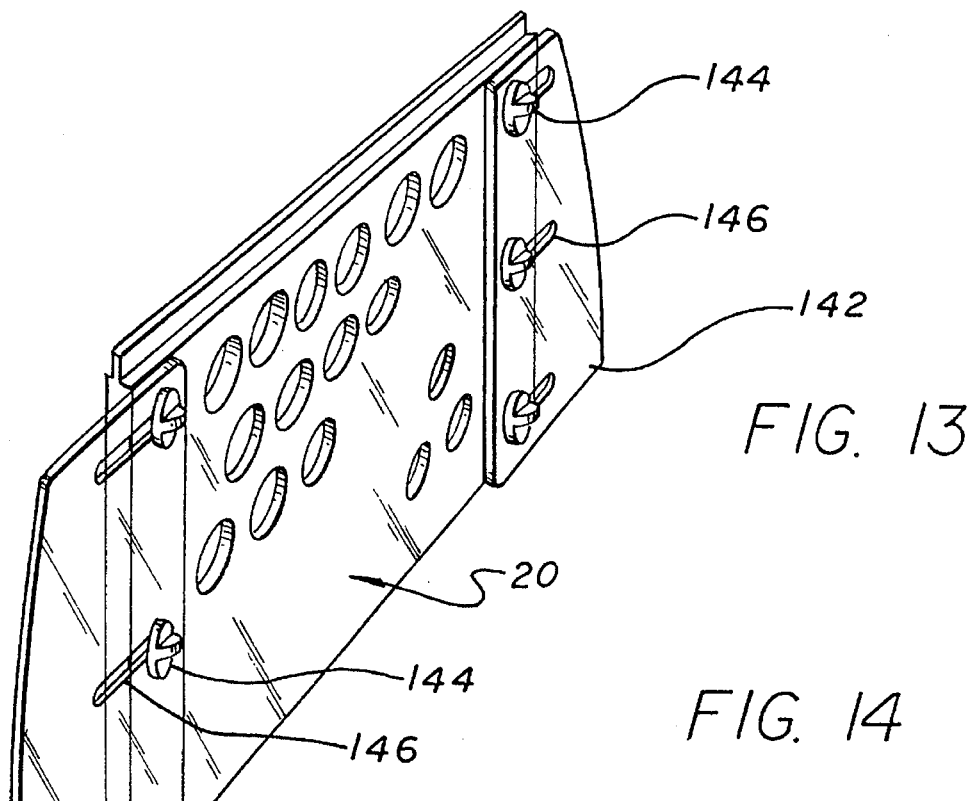
FIG. 13 is a perspective view of another alternative embodiment of the window insert.
Figure 14:
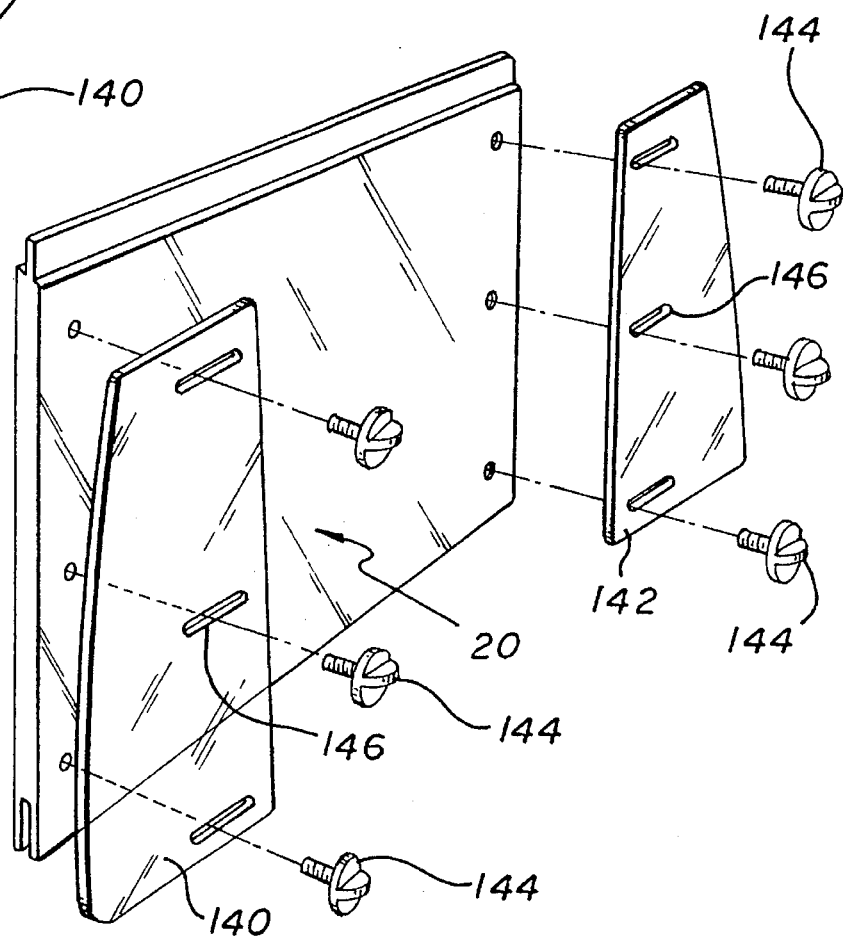
FIG. 14 is an exploded perspective view of the alternative embodiment of FIG. 13.

FIGS. 13 and 14 depict another alternative embodiment for a window insert 20 essentially as shown in FIGS. 1 and 2, and including side shields 140 and 142 which may be secured to the window insert 20 by screws 144. The side shields 140 and 142 may include elongated slots 146 allowing the screws 144 to pass therethrough so that the positioning of the side shields 104 and 142 may be varied. The side shields 140 and 142 are operative to add width and thereby customize the fit of the window insert 20 to particular automotive body styles. The side shields 140 and 142 are preferably made from the same materials as the window insert 20, and may be tinted or opaque.

Figure 15:
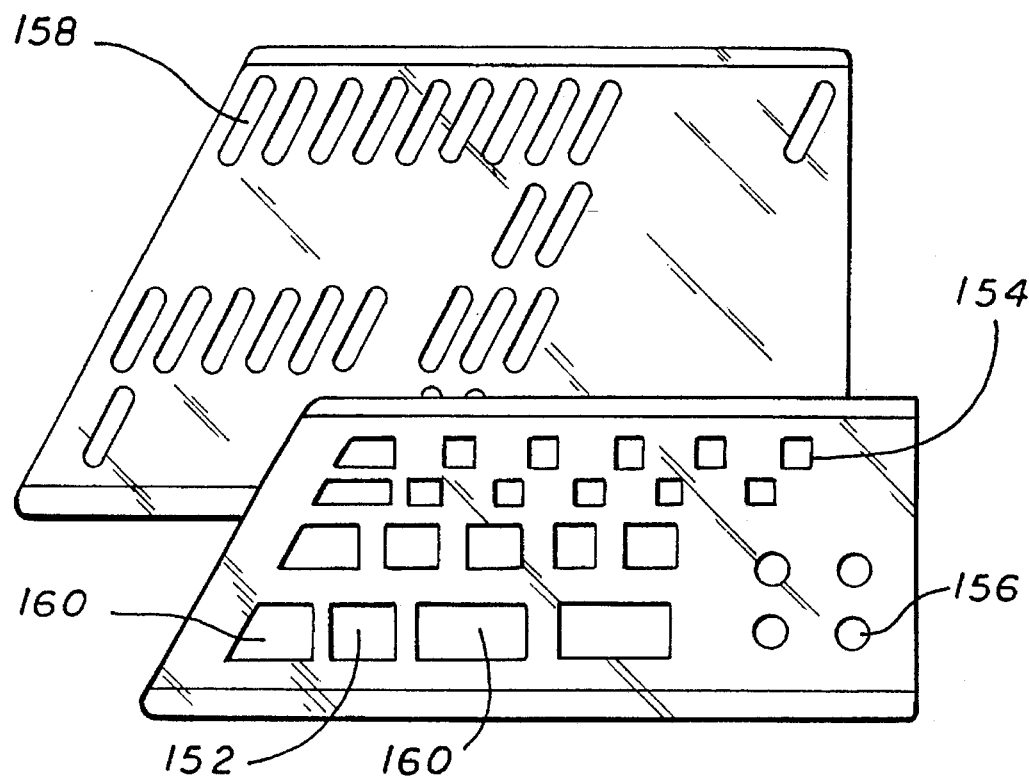
FIG. 15 depicts alternative designs for the orifices of the window insert.

As depicted in FIG. 15, the shapes and configurations of the plurality of orifices 150 can vary not only from one design to the next, but even within a particular window insert 20. Thus, there may be larger orifices 152 near the base or bottom and smaller orifices 154 at the top, and the orifices may be circular 156, oblong 158, or other desired shapes 160 and the relative spacing between the orifices may be varied.

The window inserts detailed above are preferably formed from an optically transmissive or transparent, high impact material such as plastics, plexiglass, or polycarbonate. For use in the rear passenger doors, the window inserts may be tinted, or may include sun shading.

The formation of the orifices may impede the optical transmissivity of the window insert, at least to the extent of viewing at an angle other than aligned with the axes of the orifices in the window insert. Thus, to enhance the ability of the driver of the vehicle to be able to clearly see through the window insert, the bore angle of the respective orifices is preferably aligned with the angle or line-of-sight at which the driver of the vehicle will look through the window insert, when it is placed in a particular passenger (or driver) window. Thus, it may be preferable to have the orifices simply perpendicular to the plane surfaces of the window insert as shown in FIGS. 1 and 2 for use in a front passenger window. However, for a right rear passenger window, the orifices should be angled at between about 5° to 20° to perpendicular, and for a left rear window, the orifices may be angled between about 60° and 85° to perpendicular.

Moreover, for a second aspect of the invention, wherein the window insert is to be used primarily as a high impact resistant bullet-proof shield, the window insert may be either devoid of orifices as they are illustrated in FIGS. 1–15, or the orifices may be aligned so that they do not provide a direct line-of-sight access to the driver, when the driver is normally positioned within the vehicle. For these applications, the window insert may be fabricated from a glass composite or a glass-plastic composite having at least a "Level-1" impact resistance and preferably a "Level-2" impact resistance.

Aesthetically, it is desirable to have a curved window insert which accommodates the natural contour of the curved glass window of most standard vehicles. However, it is less expensive to fabricate window inserts from a flat sheet of glass composite or glass-plastic composite. For the bulletproof applications, the window insert is preferably between 2 and 5 cm in cross-sectional thickness.

Figure 16:
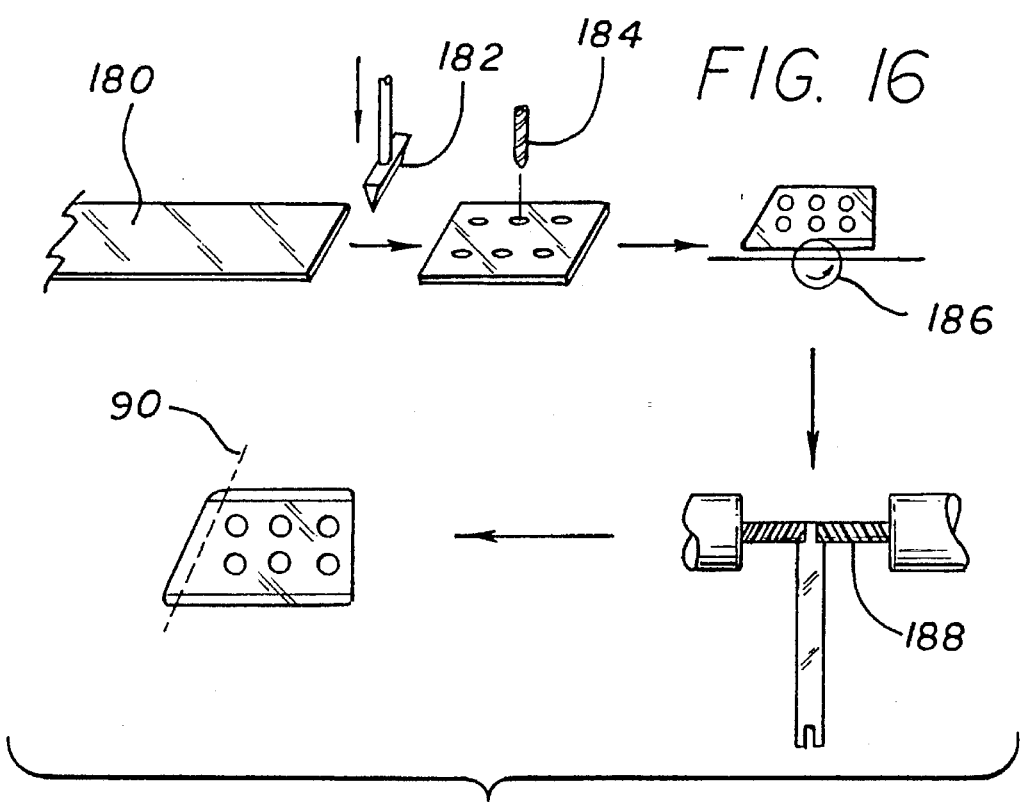
FIG. 16 illustrates the steps for manufacturing the window insert of the present invention.

FIG. 16 illustrates one method of forming or manufacturing the window inserts of the present invention. As may be appreciated, for purposes of facilitating the greatest uniformity, it is anticipated that for the child and pet retaining window insert there will be a relatively few number of available widths for the window insert. Preferably, the window insert may be fabricated from a sheet of material 180 which is formed or cut by a blade 182 to desired dimensions, and then the orifices may be formed in the formed sheet by known methods such as drilling 184, or alternatively milling, etching or laser cutting. Next, the sheets are milled or ground 186 at their lower edge 24 to define the groove 26, and cut 188 at the top edge to form the upper edge 22 to be inserted into the window frame receiving grove. The depth of the groove 26 may be as little as 0.05 cm., however, forming the depth of the groove 26 to between approximately one and five cm. increases the strength of retention of the window insert 20 within the window opening.

The window insert 20, formed according to the initial fabrication steps, is likely to be sold in widths which are equal to the largest standard window designs. The purchaser can then either themselves cut the window insert 20 to the desired shape of their particular vehicle, or the seller of the window insert 20 can perform the final cutting steps, as illustrated at 90.

Alternatively, panels or sheets of the appropriate material may be first fabricated, the holes or orifices may be formed integrally or subsequently cut, and the particular pattern for particular vehicle designs and body shapes can be custom fit to the window according to the above steps. It should also be noted that specific sizes for fitting within specified door frames may be custom made using molding or casting processes.

It may be appreciated that for those vehicles wherein the rear window does not fully retract into the door frame, the lower edge 24 of the window insert 20 may have an extended portion which extends down and covers the majority of the exposed and non-retracted window, thereby improving the protection afforded by the use of the window insert 20.

Figure 17:
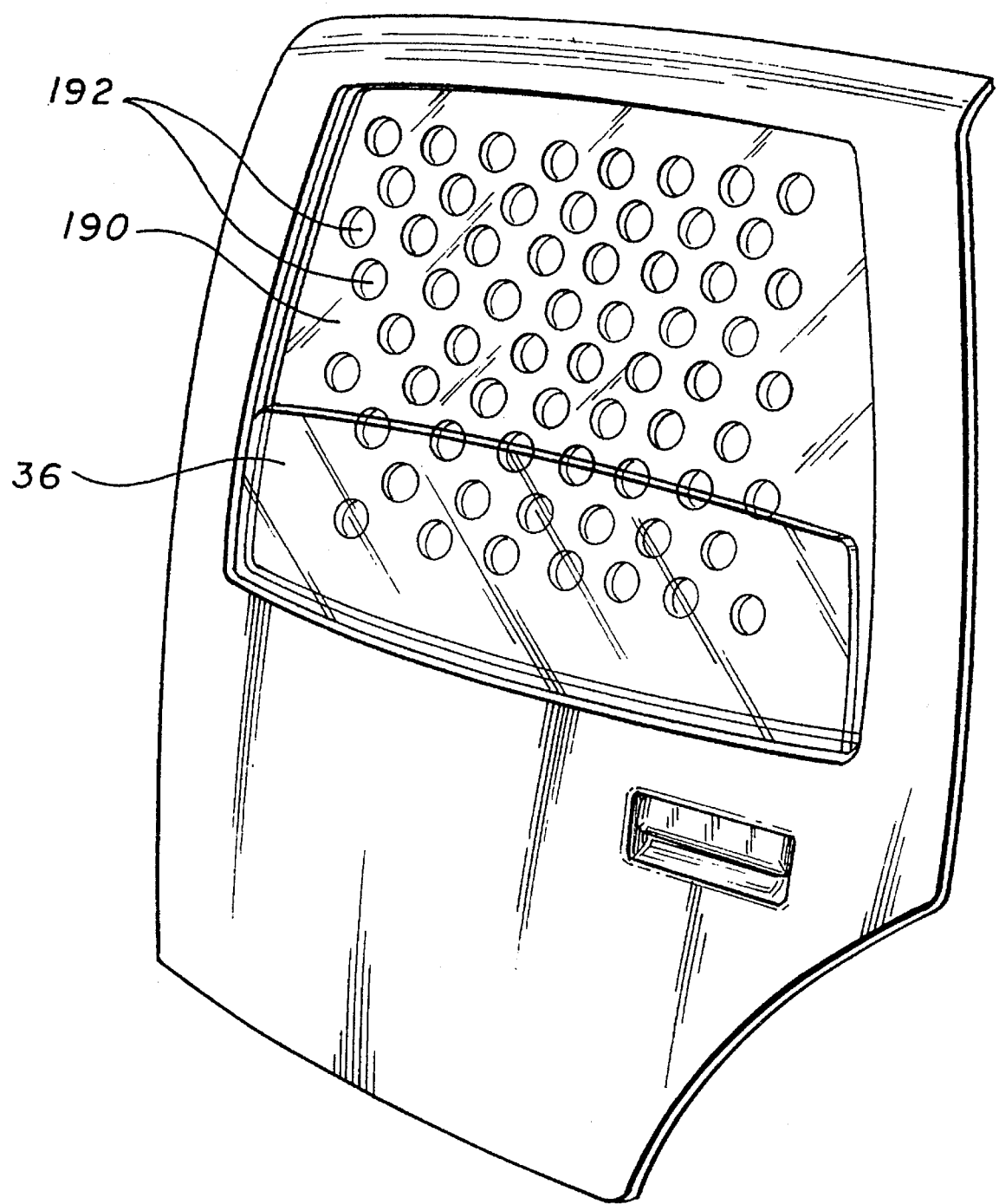
FIG. 17 is a perspective view of an alternative design for the door assembly to adopt features of the window inserts of FIGS. 1–16.

Finally, as shown in FIG. 17, the present invention also contemplates having the door manufactured or modified to accommodate the standard window 36, as well as a perforated shield 190 which may or may not be retractable. As illustrated in FIG. 17, the perforated shield includes a plurality of orifices 192 which may have the varying shapes detailed above, and wherein the bore angle of the orifices 192 are as discussed above. The perforated shield 192 is preferably formed from the same materials detailed above.

It should be evident from the foregoing description that the present invention provides many advantages over the prior art for parents, pet owners and vehicle occupants who wish to increase the security of a vehicle. Although preferred embodiments are specifically illustrated herein, it will be appreciated to those skilled in the art that many modifications and variations of the present invention are possible. It is therefore preferred that the present invention be limited only by the proper literal and equivalent scope of the appended claims.

What is claimed is:

1. A safety device for an automotive vehicle having door windows defined by a retractable glass panel which is guided into a receiving frame, the safety apparatus comprising:

a window insert formed from a sheet of optically transmissive material, said window insert having an upper edge defined to be inserted into the receiving frame, said window insert including at least one orifice allowing airflow through said window insert, said at least one orifice formed on an axis at a non-perpendicular angle to the plane of said window insert; and means positioned at a lower edge of said window insert for defining a groove for receiving the upper edge of the retractable glass panel window.

2. The safety device of claim 1 wherein said window insert includes a first plurality of orifices and a second plurality of orifices, said first plurality of orifices and said second plurality of orifices having respective axes oriented at different angles with respect to one another causing air inflow and air outflow, respectively.

3. The safety device of claim 1 wherein said window insert is formed from a material selected from the group consisting of optically transmissive polycarbonates, plexiglass, and plastics.

4. The safety device of claim 1, wherein said axis of said at least one orifice is oriented at an angle of between 5 degrees and 85 degrees.

5. The safety device of claim 4 wherein said window insert is formed from a bullet-proof material.

6. A safety device for an automotive vehicle having door windows defined by a retractable glass panel which is guided into a receiving frame, the safety apparatus comprising:

a window insert formed from a sheet of optically transmissive material, said window insert having an upper edge defined to be inserted into the receiving frame, said window insert including at least one orifice allowing airflow through said window insert, wherein the at least one orifice is formed on an axis perpendicular to the plane of said window insert;

means connected to the receiving frame for defining a groove for receiving the upper edge of the window glass panel; and means for defining a groove on a lower edge of said window insert for receiving the door window of the automotive vehicle;

wherein said window insert is formed from an optically transmissive bullet-proof material.

7. A safety device for an automotive vehicle having door windows defined by a retractable glass panel which is guided into a receiving frame, the safety apparatus comprising:

a window insert having an upper edge defined to be inserted into the receiving frame;

said window insert including at least one orifice allowing airflow through said window insert;

wherein said at least one orifice is formed on an axis at a non-perpendicular angle to the plane of said window insert; and means for defining a groove on a lower edge of said window insert for receiving the door window of the automotive vehicle;

wherein said window insert is formed from an optically transmissive bullet-proof material.

8. A safety device for an automobile having a door including a retractable window and a receiving frame for the window, said safety device comprising:

a sheet of optically transmissive material having at least one orifice covering less then fifty percent of the surface area of said sheet of optically transmissive material to allow airflow through said sheet of optically transmissive material;

a guide element affixed to the lower edge of said sheet of optically transmissive material, said guide element defining a groove on its lower edge sized to receive the upper edge of the window of the door.

9. The safety device of claim 8 wherein said sheet of optically transmissive material includes a first plurality of orifices and a second plurality of orifices, said first plurality of orifices and said second plurality of orifices having respective axes oriented at different angles with respect to one another causing air inflow and air outflow, respectively.

10. The safety device of claim 8 wherein said sheet of optically transmissive material is formed from a bullet-proof material.

11. The safety device of claim 10 wherein said bullet-proof material is selected from the group consisting of glass composite and glass plastic composite.

12. The safety device of claim 8 wherein said sheet of optically transmissive material is formed from a material selected from the group consisting of polycarbonate, plexiglass, and plastics.

13. The safety device of claim 8 wherein said safety device further comprises:

at least one side shield; and fasteners for securing said at least one side shield to said window insert.

14. The safety device of claim 8 wherein said guide element affixed to the lower edge of said first sheet of optically transmissive material is a generally H-shaped element having an upper groove receiving a lower edge of said sheet of optically transmissive material and a lower groove sized to receive an upper edge of said window.

15. The safety device of claim 8 wherein said guide element comprises:

a retaining sheet including a step on a side positioned adjacent said sheet of optically transmissive material, said step preferably equal in height to the thickness of a standard window; and fasteners for securing said retaining sheet to said sheet of optically transmissive material.

16. A method of forming a safety device for an automotive vehicle having door windows defined by a retractable glass panel which is guided into a receiving frame, the method comprising;

forming a sheet of optically transmissive material into a panel having a plurality of orifices, which orifices combine to define a total open surface area of less than fifty percent of the surface area of said sheet of optically transmissive material;

forming an upper edge on said panel to define a ridge sized to be inserted into the window receiving frame; and forming a lower edge on said panel to define a groove for receiving the upper edge of the window.

* * * * *